(12) United States Patent
Lind

(10) Patent No.: US 6,573,521 B1
(45) Date of Patent: Jun. 3, 2003

(54) RADIATION SOURCE

(75) Inventor: Steinar Lind, Oslo (NO)

(73) Assignee: Simrad Optronics ASA, Oslo (NO)

(*) Notice: Subject to any disclaimer, the term of this patent is extended or adjusted under 35 U.S.C. 154(b) by 0 days.

(21) Appl. No.: 09/720,421

(22) PCT Filed: Jul. 9, 1999

(86) PCT No.: PCT/NO99/00230
§ 371 (c)(1),
(2), (4) Date: Dec. 22, 2000

(87) PCT Pub. No.: WO00/04350
PCT Pub. Date: Jan. 27, 2000

(30) Foreign Application Priority Data

Jul. 14, 1998 (NO) .......................... 19983251

(51) Int. Cl.⁷ .................................. G01J 1/00
(52) U.S. Cl. .................. 250/504 R; 250/493.1; 250/495.1; 250/505; 219/209; 219/553; 338/306; 338/307
(58) Field of Search ................ 250/504 R, 493.1, 250/494.1, 495.1, 505.1, 338.1; 219/209, 553; 338/306, 307, 308–314

(56) References Cited

U.S. PATENT DOCUMENTS

| 4,644,141 A | | 2/1987 | Werner et al. | |
| 5,220,173 A | * | 6/1993 | Kanstad | 250/493.1 |
| 5,369,277 A | | 11/1994 | Knodle | |
| 5,939,726 A | * | 8/1999 | Wood | 250/493.1 |
| 6,297,511 B1 | * | 10/2001 | Syllaios et al. | 250/493.1 |

FOREIGN PATENT DOCUMENTS

| EP | 0 692 702 A1 | 1/1996 |
| EP | 0 729 016 A2 | 8/1996 |
| GB | 2 117 957 A | 10/1983 |
| WO | WO 97/09593 A1 | 3/1997 |

* cited by examiner

Primary Examiner—John R. Lee
Assistant Examiner—Zia R. Hashmi
(74) Attorney, Agent, or Firm—Rothwell, Figg, Ernst & Manbeck

(57) ABSTRACT

Radiation source for emitting radiation in pulses with a duration and at intervals within chosen ranges, comprising at least one plate-shaped radiant element (1), and at least two electrical conductors coupled to the element(s). The source also includes at least one plate-shaped surrounding, thermally conductive element (2) being thermally coupled to a radiation element at its inner edge, and being thermally coupled to a cooling device (3) at its outer surface.

8 Claims, 1 Drawing Sheet

RADIATION SOURCE

This invention relates to a radiation source for emitting radiation in pulses with a duration and at intervals within chosen ranges, comprising at least one plate-shaped radiant element and at least two electrical conductors coupled to the element(s).

Infrared radiation e.g. for use in gas analysers, are typically generated using a thermal radiation source whose surface is heated to such a temperature that the surface in accordance with Plancks radiation law and the spectral emissivity of the surface emits the required radiant power at the wavelengths measured by the gas analyser.

A number of this type of emitters are known, being adapted to emit pulsed or continuous black or grey body radiation. Examples are shown in the following patent applications: EP 692.702, EP 729.016, NO 149.679, PCT/GB95/02446, PCT/NO96/00216, U.S. Pat. No. 4,644,141 and U.S. Pat. No. 5,220,173.

In EP 692.702 a source is described in which the radiant element is surrounded by an insulating material to minimize the heat loss. The source is not prepared for pulsing.

A problem related to pulsed infrared transmitters is the need for effective cooling of the source to obtain sufficient contrast between radiation in the pulses and during the intervals. At the same time, the heat conduction must be sufficiently small to let the source obtain the required temperature during the pulse.

EP 729.016 describes a pulsed infrared source using filaments being heated by an electrical current. The filaments are positioned at a chosen distance from a surface, this distance being dependant on the required cooling of the filaments.

In PCT/GB95/02446 an infrared emitting device is shown comprising a foil provided with resistive elements being heated by an electrical current. The device is cooled by radiation, and thus has to be thin.

A problem related to the use of filaments and thin foils is their relatively short life span, as they are vulnerable and may easily break as a result of overheating or mechanical shock.

A solution discussed in PCT/NO96/00216 and NO 149.679 comprises electrically conductive, planar surfaces adapted to emit infrared radiation. The emitter is mounted on a substrate supporting the emitter and conducting the excess heat away. A problem with this solution is that the heat is conducted transversally through the substrate to the environment, resulting in large dynamic differences in temperature and corresponding thermic stress in the material making the lifetime of the source unpredictable, or limiting the temperatures which may be used on the source.

U.S. Pat. No. 5,220,173 is another example showing a radiation cooled source being sufficiently thin to radiate more energy during the pulse than is stored in the element. This, however, is not a practical solution, as it is difficult to produce a sufficiently thin membrane being able to withstand the high temperature of the source when radiating and the mechanical strain on the membrane at rapid changes in temperature. Also, when the membrane is sufficiently thin, the material will become transparent, reducing or destroying the capability of radiating the supplied energy. A similar solution is shown in U.S. Pat. No. 4,644,141, in which a radiator comprising a resistance layer is arranged on a thin substrate.

The required temperature of the source is usually obtained by adjusting the provided electrical current in the source, thus demanding a system capable of adjusting the current through the source.

It is an object of this invention to provide a pulsed radiation source having sufficient contrast in radiation between the exited and the relaxation periods. This is especially important when used in gas detection instruments using two or more pulsed radiation elements radiating on different wavelengths, the radiation of which being separated in time, so that the radiation from the different sources in their relaxation periods do not disturb the radiation from the emitting source.

It is also an object of this invention to provide a radiation source being capable of controlling the temperature, and thus the emitted wavelength, of the source in a simple way.

The objects of the invention is obtained using a radiation source as described above, being characterized in that it also includes at least one plate-shaped surrounding, thermally conductive element being thermally coupled to a radiation element at its inner edge, and being thermally coupled to a cooling element at its outer surface.

The present invention will be described below with reference to the accompanying drawing, showing by way of example one embodiment of the invention.

Figure 1:
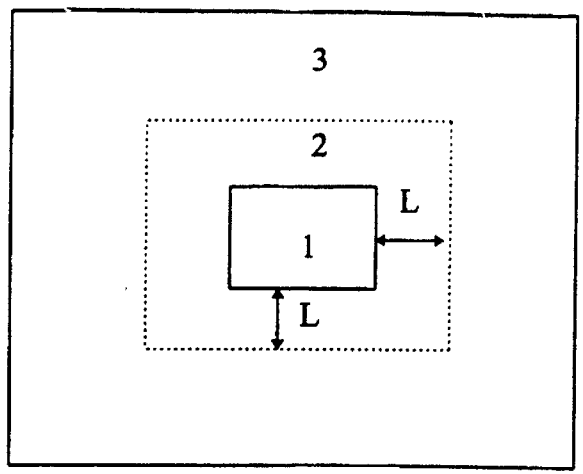
FIG. 1 shows a simplified sketch of an embodiment of the invention, as seen from above.

The plate- or membrane-shaped radiation element 1 of the source comprises in a per se known way a resistance layer adapted to be supplied with an electrical current. The material in which the radiation element is made is preferably silicon or other materials suitably for micro machining. The resistance layer, as well as the electrical conductors 4 (see FIGS. 3 and 4) supplying the electrical current, may be produced by doping the silicon, thus providing a simple manufacturing method including few separate parts. Thus, the production of the source is simple and inexpensive, only requiring well known technology.

An important aspect of the invention is that the radiation element 1 is surrounded by a plate-shaped heat conductive element. The heat conductive element 2 has a width L.

In the drawing the heat conductive element is thermally coupled to a cooling device 3. This may be any type of heat sink or active cooling device removing the heat conducted from the radiating element, such as a Peltier element. Preferably the cooling device simply constitutes the housing of the source, thus being cooled by the environment.

During a pulse an electric current is sent through the radiation element for a chosen period of time, heating it to a certain temperature to obtain radiation with a chosen effect. The heat stored in the radiation element during the pulse is lead away by thermal diffusion through the heat conductive element 2 during the interval between the periods in which the electric current is sent through the radiation element. The value of L is thus chosen depending on the use of the radiation element, the pulse frequency, and the length of the intervals between the pulses.

The exact value of L may be chosen through experimentation or calculated for example by using the following formula in which $\delta T_0(r_0, t_0)$ is the initial temperature difference resulting from a pulse with energy Q at the time t=0 in the point r=0 will change due to thermic diffusion to $\delta T(r,t)$:

$$\delta T(r, t) = \frac{Q}{4\rho C(\pi \kappa t)^{3/2}} e^{-r^2/4\kappa t}$$

where ρ is the density and C is specific heat.

The thermic diffusion time for the material to a distance r from $r_0$ is proportional to the square of the distance $$t = \frac{r^2}{6\kappa}$$

The thermic diffusion length for the material during the time t is thus $$r = \sqrt{6Kt}$$

If the heat conductive element is made from silicon, which has a thermic diffusion constant K=0,9 cm²/s, the diffusion length r is 2 mm at 7 ms.

To obtain effective heating of the membrane, the width L is chosen to give a diffusion time $t_1$ being longer than the emitted pulse.

As mentioned above the radiation element 1 must be cooled sufficiently to radiate insignificantly at the relevant wavelength. The time between the pulses must therefore be longer than the diffusion time $t_2$, where $t_2$ is the diffusion time from the centre of the radiating element 1 to the outer edge of the heat conductive element 2. This way the central part of the radiating element is cooled effectively.

If two or more radiating elements are used emitting with different maximum wavelengths, the interval between the pulses from the different elements must at least be long enough to let the radiation from the previous radiating element be insignificant at the maximum wavelength of the next radiating element.

The heat conductive element 2 essentially surrounding the radiating element 1 maximizes the heat transportation to the cooling device 3, thus providing an effective cooling of the system. In some cases it may, however, be preferable to provide a heat conductive element 2 which does not surround the radiating element completely, e.g. to reduce the capability of the membrane to conduct the heat away in chosen directions, for example to obtain a certain emitter shape or to increase the cooling time.

The temperature obtained by the radiating element depends on two parameters, the current conducted through the resistance layer and the time the electrical current is provided. The temperature may thus be adjusted by controlling the duration of the supplied electrical current. Therefore the temperature may be controlled using well known technology controlling the duration of an electrical pulse, without the need for complicated power supplies controlling the electrical current. The temperature may be measured directly or by measuring the spectrum of the emitted radiation.

Figure 2:
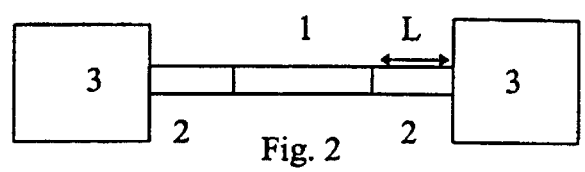
FIG. 2 shows a cross section of the embodiment shown in FIG. 1.

FIG. 2 shows the cross section of the embodiment of the invention shown in FIG. 1. The diffusion time is independent of the thickness of the membrane and the temperature obtained by the radiating element. Thus the membrane may be produced with the thickness required to give a long lifetime and to withstand the high mechanical strains occurring at rapid changes in the temperature of the membrane.

In FIG. 2 the cooling device 3 has a relatively large volume, preferably having a high heat conductivity, providing an effective heat sink with an essentially constant temperature. As mentioned above the cooling device 3 may be thermally coupled to the housing of the source.

Figure 3:
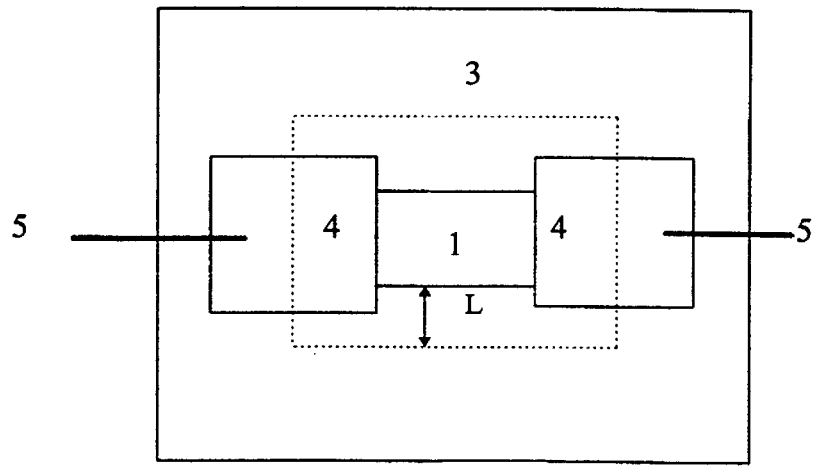
FIG. 3 shows a more detailed view of one embodiment of the invention.
Figure 4:
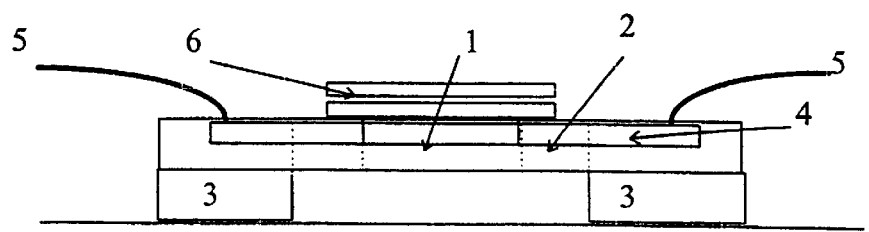
FIG. 4 shows a cross section of the embodiment shown in FIG. 3.

FIGS. 3 and 4 illustrates in more detail how a radiation source according to the invention may be constructed.

In addition to the radiation element 1, the heat conducting element 2 and the cooling device 3, electrically conducting areas 4 are shown. The illustrated electrically conductive areas 4 are, as mentioned above, preferably made by doping the membrane material, but other solutions are also possible, such as thin metal layers damped on the surface. It is, however, important that the electrically conductive areas do not affect the heat conducting capability of the heat conducting element 2 in any substantial degree.

Electrical conductors are bonded on the electrically conductive areas for supplying power to the transducer, being connected to available power supplies in a well known manner. The electrical conductors may be of any suitable type which may be bonded to the electrically conductive areas 4. It is also possible to construct a radiation source according to the invention in which the electrical conductors are connected directly to the radiation element 1, thus omitting the electrically conductive areas 4.

In FIG. 4, showing a cross section of an embodiment. of the invention, the membrane is provided with a structure 6 for improving the radiation characteristics of the source. The structures may in per se known ways be adapted to shape the emitted beam, or be constructed as a filter transmitting a chosen range of wavelengths. The structure 6 may be a multi layer structure built as a plurality of layers in order to optimize the mechanicle, optical and electrical characteristics of the source. The structures may also comrise diffractive structures, such as linear or circular gratings, or holographic structures and gratings, for shaping the emitted beam, and which also may provide a filtering of the beam.

FIG. 4 also shows the cooling device 3 as comprised by the outer part of the membrane and a thicker substrate.

As mentioned above the figures show one possible embodiment of the invention. Other embodiments are possible within the scope of this invention, as defined by the claims. for example the shape of the radiation element 1 shown in the drawings is rectangular, but other shapes, such as circular, is also possible.

The materials used in the membrane comprising the radiation element 1, the heat conductive element 2 and at least part of the cooling element may be made from a wide range of materials using other techniques than micro machining.

What is claimed is:

1. Radiation source for emitting radiation in pulses with a duration and at intervals within chosen ranges, comprising at least one plate-shaped radiant element (1), and at least two electrical conductors coupled to the element(s), and also comprising at least one plate-shaped, surrounding, thermally conductive element (2) being thermally coupled to a radiation element at its inner edge, and being thermally coupled to a cooling device (3) at its outer edge characterized in that the distance from the centre of the radiant element (1) to the cooling device (3) is chosen to provide a thermal diffusion time over said distance being less than the time interval between the pulses.

2. Radiation source according to claim 1, characterized in that the thermal diffusion time over said thermally conductive element, depending on the width L of said element, exceeds the duration of each of the pulses.

3. Radiation source according to claim 1, characterized in that said cooling element is the housing of the radiation source.

4. Radiation source according to claim 1, characterized in that it comprises a structure (6) on the surface of the radiation element (1).

5. Radiation source according to claim 4, characterized in that the structure is a diffractive structure (6), e.g. a grating, adapted to shape and/or filter the emitted beam.

6. Radiation source according to claim 4, characterized in that it the structure (6) is a multi layer structure constituting a filter transmitting a chosen optical frequency range.

7. Radiation source according to claim 1, characterized in that it comprises a control circuit being electrically coupled to the radiation element(s), for controlling the pulse length and thus the emitted wavelengths of the source, as well as the pulse intervals.

8. Radiation source according to claim 7, characterized in that it comprises two or more radiation elements, each being thermally coupled to a thermally conductive element (2) and being coupled separately to said control circuit for individual control of the emitted wavelengths and pulse intervals.

* * * * *